US012188531B2

(12) United States Patent
Tsai et al.

(10) Patent No.: US 12,188,531 B2
(45) Date of Patent: Jan. 7, 2025

(54) BRAKE DEVICE OF ROTATING MOTOR

(71) Applicant: Delta Electronics, Inc., Taoyuan (TW)

(72) Inventors: Ching-Hsiung Tsai, Taoyuan (TW);
Chung-Kuang Ko, Taoyuan (TW);
Yung-Chih Hsu, Taoyuan (TW);
Cheng-Hsun Tsai, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 443 days.

(21) Appl. No.: 17/842,723

(22) Filed: Jun. 16, 2022

(65) Prior Publication Data

US 2023/0220890 A1    Jul. 13, 2023

(30) Foreign Application Priority Data

Jan. 12, 2022   (CN) .......................... 202210033758.X

(51) Int. Cl.
*F16D 55/22* (2006.01)
*F16D 121/22* (2012.01)

(52) U.S. Cl.
CPC .......... *F16D 55/22* (2013.01); *F16D 2121/22* (2013.01)

(58) Field of Classification Search
CPC ..... F16D 55/22; F16D 2121/22; H02K 7/102; H02K 5/24
See application file for complete search history.

(56) References Cited

U.S. PATENT DOCUMENTS

| 6,182,803 B1* | 2/2001 | Hirai ....................... F16D 55/02 188/161 |
| 2017/0058975 A1 | 3/2017 | Szewczyk et al. |
| 2018/0172097 A1 | 6/2018 | Prouzet |

FOREIGN PATENT DOCUMENTS

| CN | 210431134 U | 4/2020 |
| CN | 111211638 A | 5/2020 |
| CN | 213419733 U | 6/2021 |
| EP | 1001508 A2 | 5/2000 |
| JP | H11230203 A | 8/1999 |
| JP | 2018528362 A | 9/2018 |
| JP | 2018157722 A | 10/2018 |
| JP | 3232177 U | 5/2021 |
| TW | 470264 U | 12/2001 |
| TW | M580146 U | 7/2019 |
| TW | M587706 U | 12/2019 |
| TW | I729940 B | 6/2021 |

* cited by examiner

*Primary Examiner* — Pamela Rodriguez
(74) *Attorney, Agent, or Firm* — KIRTON McCONKIE; Evan R. Witt

(57) ABSTRACT

A brake device of a rotating motor is disclosed and includes a base, an upper plate, a sliding plate, a transmission component, a lining plate, a connection element, a planar plate and an elastic component. A rotating shaft runs through the base in an axial direction. The sliding plate is arranged between the base and the upper plate, and driven by the drive module. The transmission component is sleeved and fixed on the rotating shaft, and includes a sleeved peripheral edge, a limiting portion, and a perforation. The limiting portion is protruded outwardly from the sleeved peripheral edge in a radial direction, and the perforation is passed through the limiting portion along the axial direction. The lining plate sleeved on the sleeved peripheral edge is located between the sliding plate and the upper plate. The elastic component is arranged between the planar plate and the limiting portion.

13 Claims, 8 Drawing Sheets

BRAKE DEVICE OF ROTATING MOTOR

FIELD OF THE INVENTION

The present disclosure relates to a brake device of a rotating motor, and more particularly to a brake device applied to a rotating motor for providing a lining plate with an axial limitation and avoiding the wear and the noise during the rotation of the lining plate.

BACKGROUND OF THE INVENTION

The brake devices of the rotating motors are divided typically into two types, a dynamic type and a holding type, based on the functions. When the rotating motor is powered off, the rotor of the rotating motor is kept rotating for a while due to inertia before being stopped completely. In the applications of the rotating motor for many industries, if the rotating motor has to be stopped immediately after the power is cut off, the dynamic brake device is utilized to realize and meet the requirements. When the rotation of the rotating motor is stopped, if it is necessary to ensure that the load end is not allowed to rotate or loosen, the holding brake device is utilized to meet the requirements. A conventional brake device of the rotating motor includes a base, a sliding plate, a lining plate, an upper plate and a square iron bar (or a spline). The base is fastened on a frame of the rotating motor. A driving module formed by the coils and the springs is set in the base. When the driving module is powered on, the electromagnetic force generated by the coils attracts the sliding plate to attach to the base, so that the lining plate disposed between the upper plate and the sliding plate has the rotational freedom, and the lining plate, the square iron bar (or the spline) and the rotor are rotated after being assembled. When the driving module is powered off, the sliding plate without the magnetic attraction is pushed up by the springs, and the lining plate is pushed by the sliding plate to abut against the upper plate. In that, the lining plate has no rotational freedom due to the clamping of the sliding plate and the upper plate, and the rotation of the rotor is stopped through the square iron bar (or the spline).

However, when the driving module is powered on and the rotor is rotated, the lining plate is not restrained in the axial direction. It is easy to cause the lining plate to move up and down due to the influence of gravity, and cause the abrasion of the lining plate due to deflection. Furthermore, the abrasion of the lining plate is accompanied with the generations of the noise and the debris, so as to pollute the bearings and the encoders under a slight case, or make the brake device failure under a serious case.

Therefore, there is a need of providing a brake device of a rotating motor to provide a lining plate with an axial limitation, avoid the wear and the noise during the rotation of the lining plate, and obviate the drawbacks encountered by the prior arts.

SUMMARY OF THE INVENTION

An object of the present disclosure is to provide a brake device applied to a rotating motor. By using an axial limiting structure for the lining plate, the wear and the noise during the rotation of the lining plate are avoided. The axial limiting structure is realized by adding a planar plate, a plurality of connection elements and a plurality of elastic components. An axial height is maintained between the planar plate and the lining plate through the plurality of connection elements, and a resilient force is provided between the planar plate and the transmission component by the plurality of elastic components, so that the lining plate is driven by the planar plate to abut against the transmission component. Since the lining plate abuts against the transmission component along the axial direction to form an axial limitation, when the transmission component drives the lining plate to rotate, it is not easy to cause the lining plate to move up and down due to the influence of gravity, or cause the abrasion of the lining plate due to the deflection. At the same time, the generations of the noise and the debris are avoided.

Another object of the present disclosure is to provide a brake device applied to a rotating motor. The planar plate, the plurality of connection elements and the plurality of elastic components are additionally disposed on the lining plate to realize the axial limiting structure, so that the axial limiting structure is in a misaligned arrangement with the brake structure formed by the base, the upper plate and the transmission component. Preferably, the planar plate, the plurality of connection elements and the plurality of elastic components are received within the base hollow portion, so that the axial limiting structure is installed without increasing the size of the overall structure. Thus, the reliability of the brake device and the competitiveness of the product are enhanced.

In accordance with an aspect of the present disclosure, a brake device of a rotating motor for braking a rotating shaft is provided and includes a base, an upper plate, a sliding plate, a transmission component, a lining plate, a plurality of connection elements, a planar plate and a plurality of elastic components. The base includes a driving module and a base hollow portion. The rotating shaft passes through the base hollow portion along an axial direction. The upper plate is spatially corresponding to the base, spaced apart from the base along the axial direction and disposed on the base. The sliding plate is disposed between the base and the upper plate, and driven by the driving module to be attached to the base or be spaced apart from the base along the axial direction. The transmission component is sleeved and fixed on the rotating shaft to rotate synchronously with the rotating shaft. The transmission component includes a sleeved peripheral edge, a limiting portion and a plurality of perforations, the limiting portion is protruded outwardly from the sleeved peripheral edge in a radial direction of the rotating shaft, and the plurality of perforations are passed through the limiting portion along the axial direction. The lining plate is sleeved on the sleeved peripheral edge of the transmission component along the axial direction, engaged with the sleeved peripheral edge of the transmission component, and carried on an upper surface of the limiting portion. The lining plate is located between the sliding plate and the upper plate. When the driving module drives the sliding plate to be spaced apart from the base, the lining plate is clamped by the sliding plate and the upper plate, so that the transmission component and the rotating shaft are stopped and motionless synchronously. When the driving module drives the sliding plate to be attached to the base, the lining plate is spaced apart from the sliding plate and the upper plate, so that the lining plate is driven by the transmission component to rotate. The planar plate is spatially corresponding to the lining plate, and the plurality of the connection elements are connected between the planar plate and the lining plate through the plurality of perforations, respectively. Each of the plurality of elastic components is sleeved on the corresponding one of the plurality of connection elements, and disposed between the planar plate and a lower surface of the limiting portion, and the plurality of elastic components are configured to provide a resilient force, so that the lining plate is driven by the planar plate to abut against the upper surface of the limiting portion along the axial direction.

In an embodiment, the driving module includes a spring component and a coil component, and the spring component is disposed between the base and the sliding plate and is configured to provide a pushing force for driving the sliding plate to be spaced apart from the base, wherein the coil component is embedded within the base, and a magnetic attraction force is generated when energizing for driving the sliding plate to resist the pushing force and be attached to the base.

In an embodiment, each of the plurality of connection elements includes a fastening bolt and a bushing, each of the bushings passes through the corresponding one of the plurality of perforations and is connected between the lining plate and the planar plate, and each of the fastening bolts passes through the corresponding bushing to fasten the lining plate and the planar plate.

In an embodiment, the bushings have an axial height, and the axial height is greater than a distance between the upper surface and the lower surface of the limiting portion.

In an embodiment, each of the elastic components includes a compression spring sleeved on an outer periphery of the corresponding bushing, so that the resilient force is provided between the planar plate and the lower surface of the limiting portion.

In an embodiment, the lining plate includes a plurality of first connection apertures spatially corresponding to the plurality of perforations of the transmission component, and the planar plate includes a plurality of second connection apertures spatially corresponding to the plurality of perforations of the transmission component, wherein each of the fastening bolts passes through the corresponding first connection aperture, the corresponding bushing and the corresponding second connection aperture to fasten the lining plate and the planar plate, wherein a diameter of the first connection aperture and a diameter of the second connection aperture are less than a diameter of the bushing, respectively.

In an embodiment, the transmission component is a square iron bar or a spline.

In an embodiment, the base is in a misaligned arrangement with the limiting portion, the planar plate, the plurality of connection elements and the plurality of elastic components in the axial direction.

In an embodiment, the transmission component includes at least one fastening hole extended along the radial direction of the rotating shaft, and the brake device includes at least one fastening element, wherein the fastening element passes through the corresponding fastening hole to fasten the transmission component on the rotating shaft.

In an embodiment, the plurality of connection elements, the plurality of elastic components and the plurality of perforations are in an identical number N, N is an integer, and N is greater than or equal to 3.

In an embodiment, the plurality of perforations are centered at the rotating shaft and arranged equidistantly on the limiting portion.

In an embodiment, the lining plate includes a sleeving opening, and the lining plate is sleeved on the sleeved peripheral edge of the transmission component through the sleeving opening, wherein the sleeving opening of the lining plate is greater than or equal to the sleeved peripheral edge of the transmission component.

In an embodiment, the sliding plate includes a sliding-plate hollow portion, the upper plate includes an upper-plate hollow portion, the planar plate includes a planar-plate hollow portion, and the rotating shaft passes through the base hollow portion, the sliding-plate hollow portion, the upper-plate hollow portion and the planar-plate hollow portion.

In an embodiment, the upper plate, the sliding plate, the planar plate and the base are in a ring structure, respectively.

In an embodiment, the brake device of the rotating motor further includes a plurality of spacer supports, wherein the plurality of spacer supports are connected between the base and the upper plate, respectively, and the plurality of spacer supports and the sliding plate are in a misaligned arrangement with each other.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
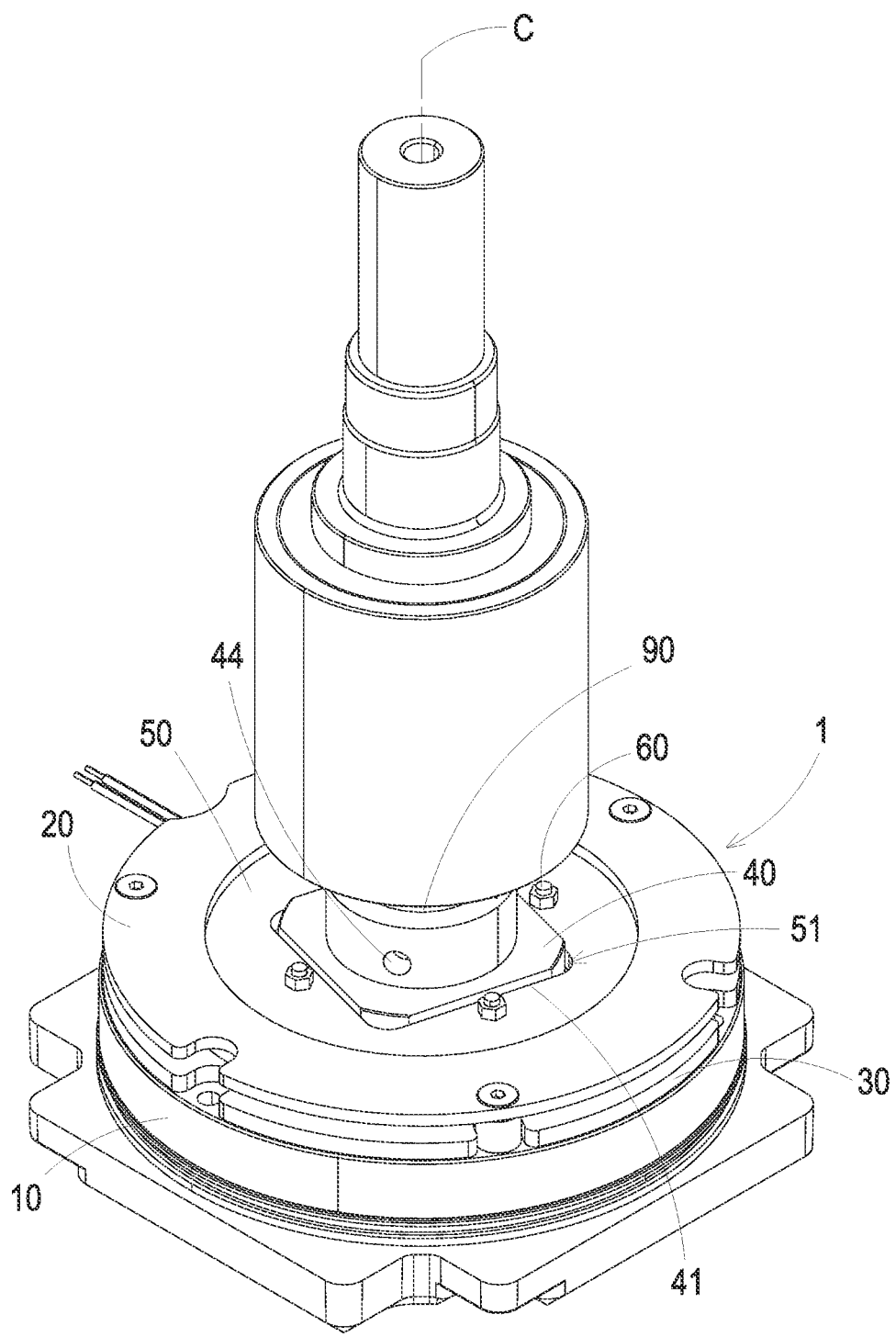
FIG. 1 is a schematic structural view illustrating a brake device applied to a rotating motor according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
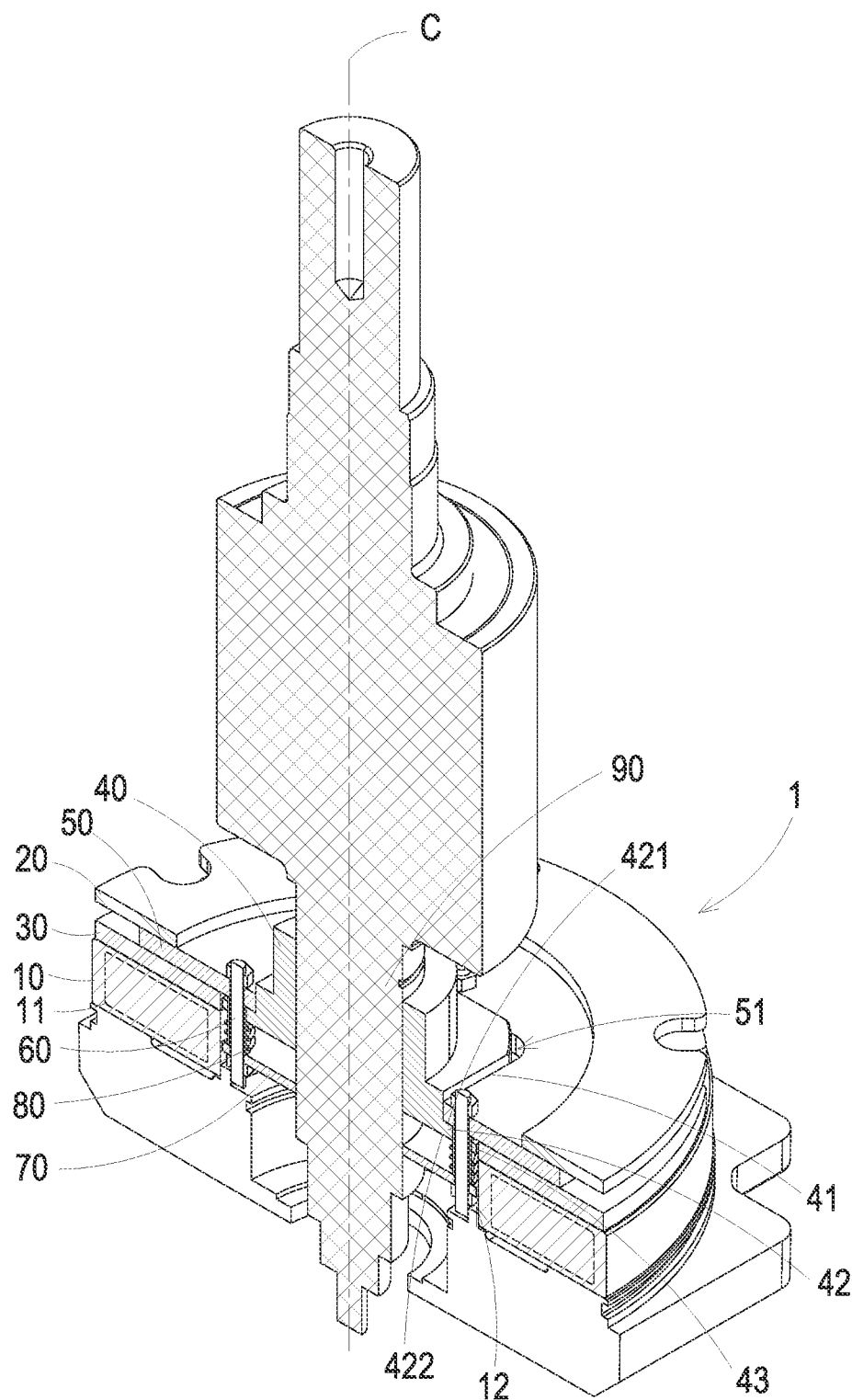
FIG. 2 is a cross-sectional structural view illustrating the brake device applied to the rotating motor according to the embodiment of the present disclosure.
Figure 3:
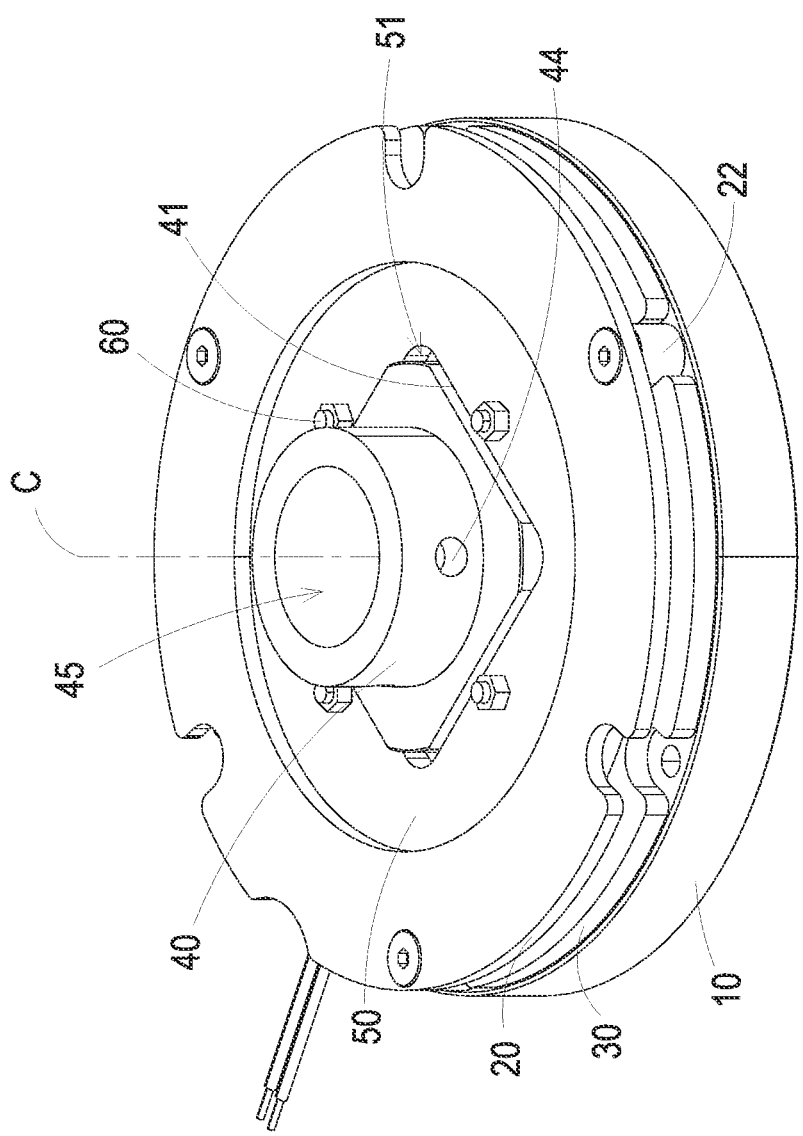
FIG. 3 is a schematic structural view illustrating the brake device according to the embodiment of the present disclosure.
Figure 4:
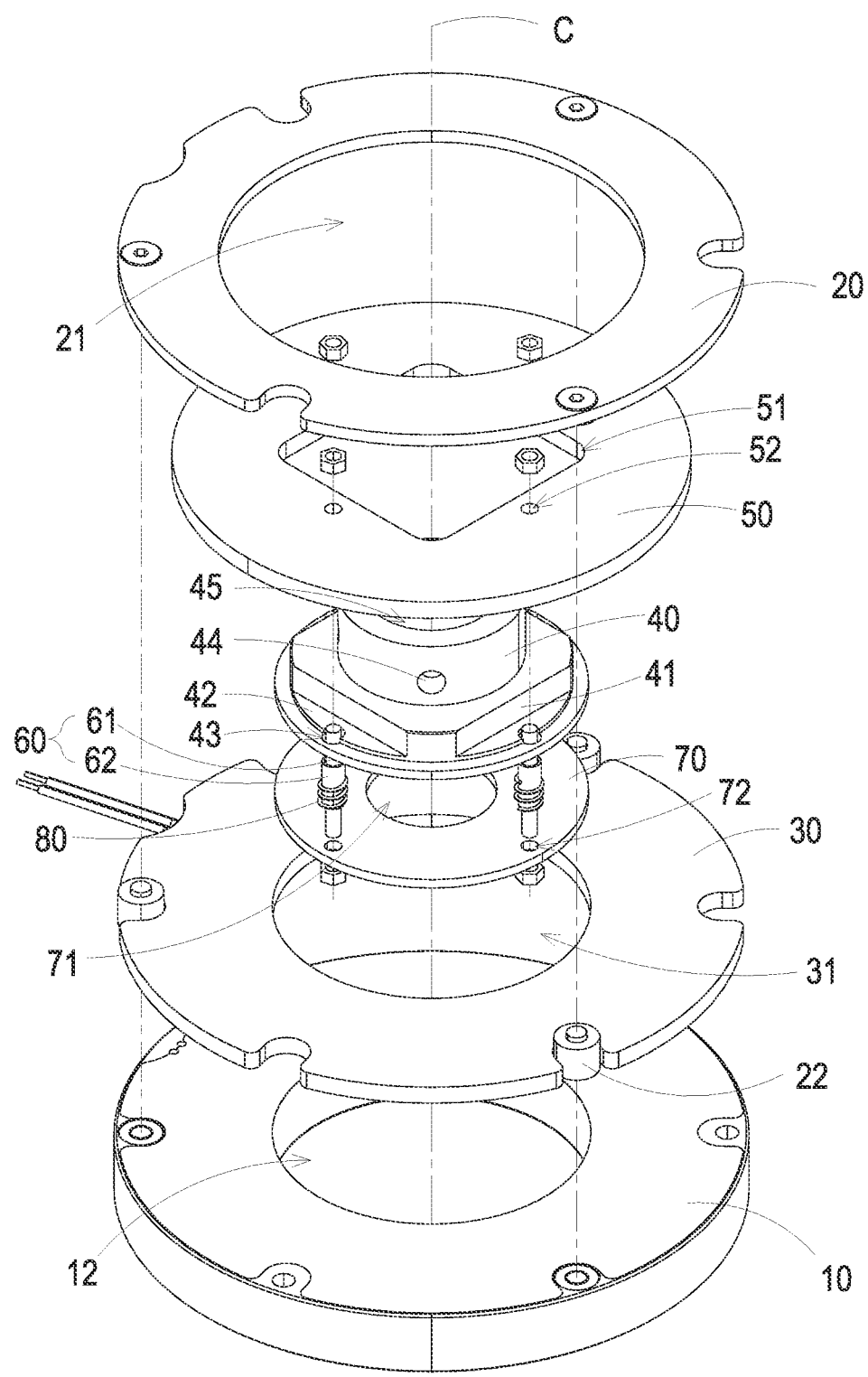
FIG. 4 is an exploded view illustrating the brake device according to the embodiment of the present disclosure.
Figure 5:
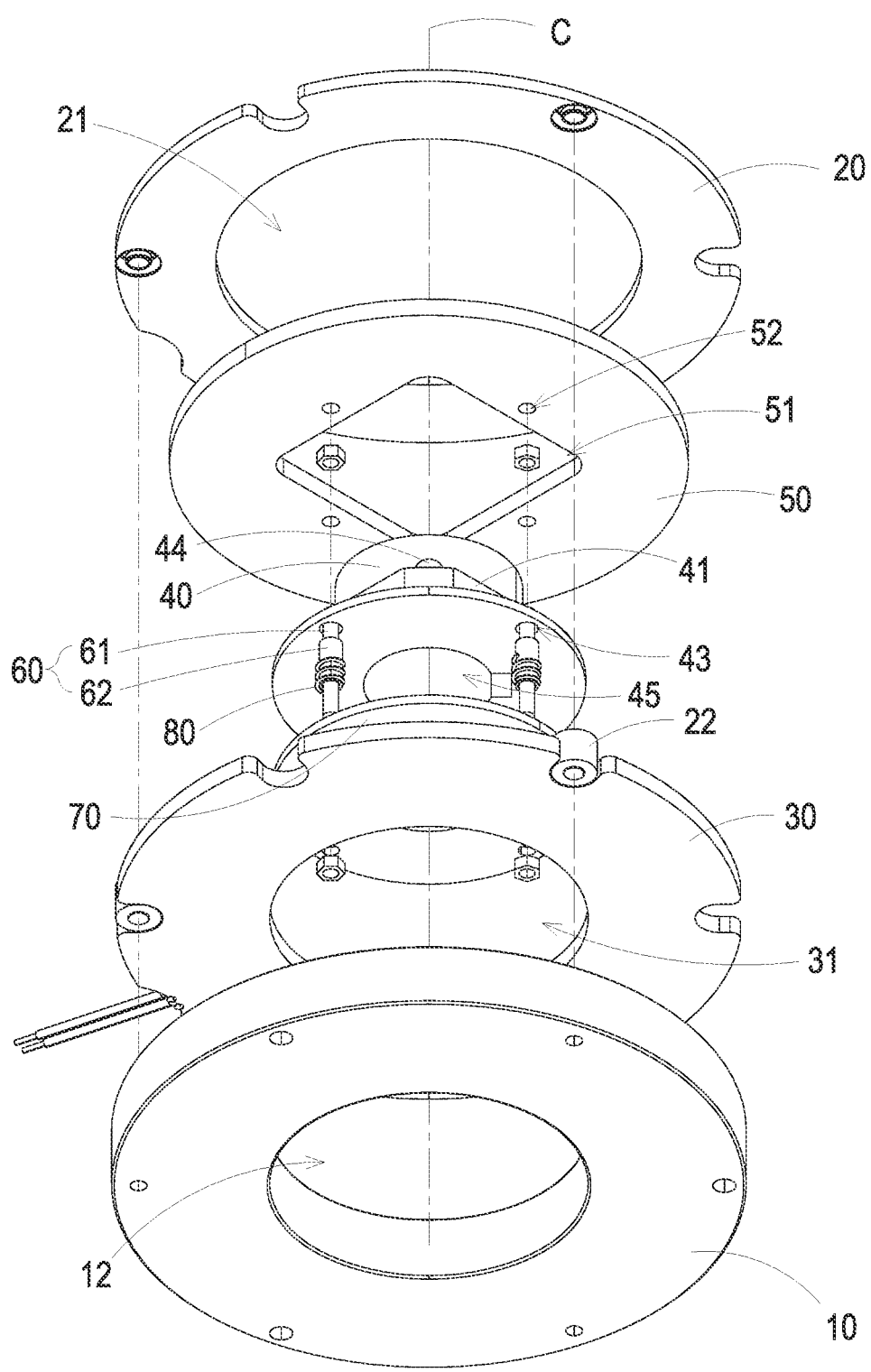
FIG. 5 is an exploded view illustrating the brake device according to the embodiment of the present disclosure and taken from another perspective.
Figure 6:
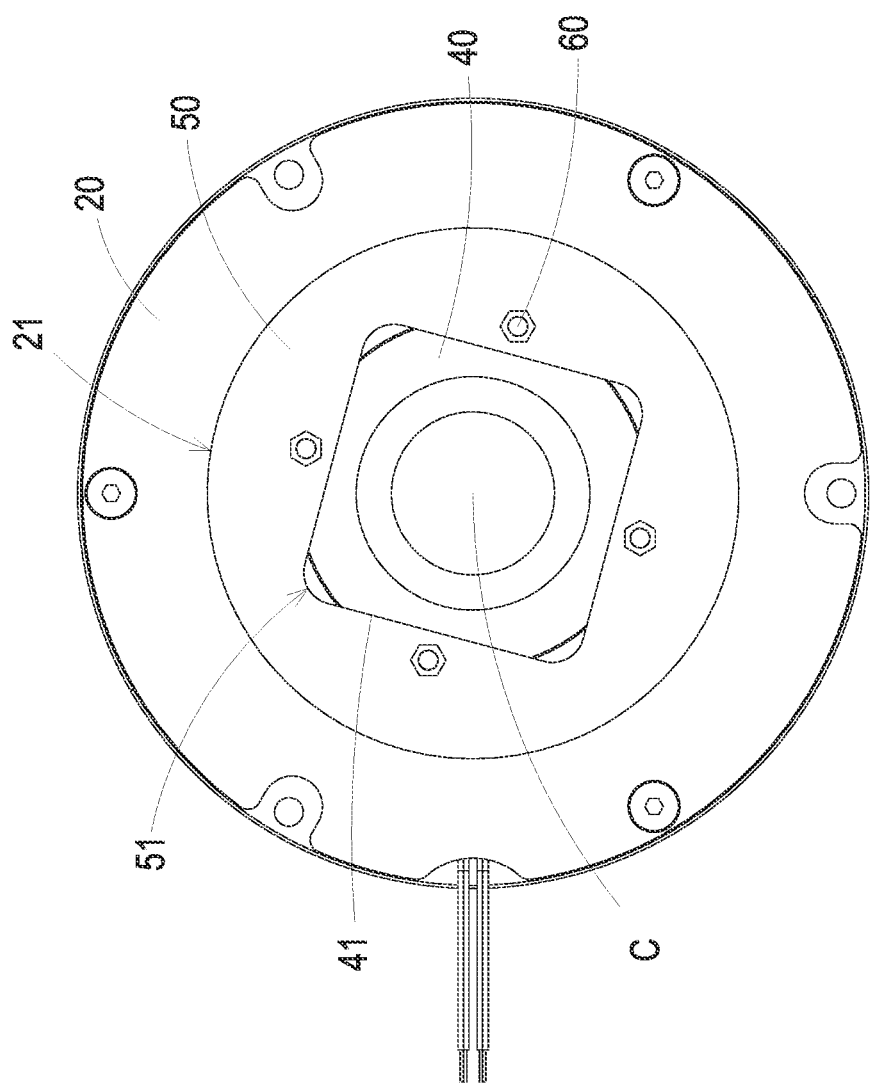
FIG. 6 is a top view illustrating the brake device according to the embodiment of the present disclosure.
Figure 7:
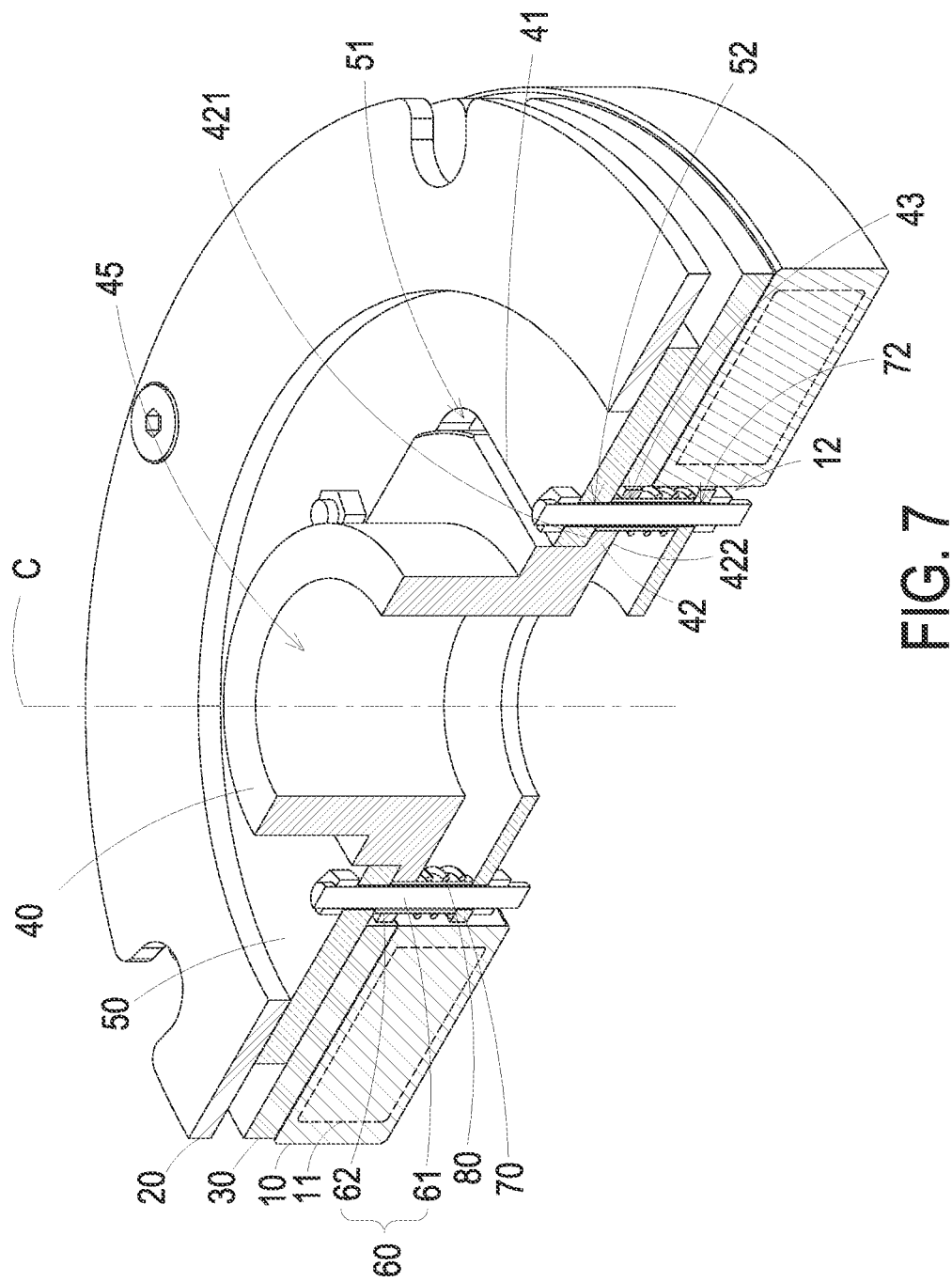
FIG. 7 is a cross-sectional structural view illustrating the brake device according to the embodiment of the present disclosure.
Figure 8:
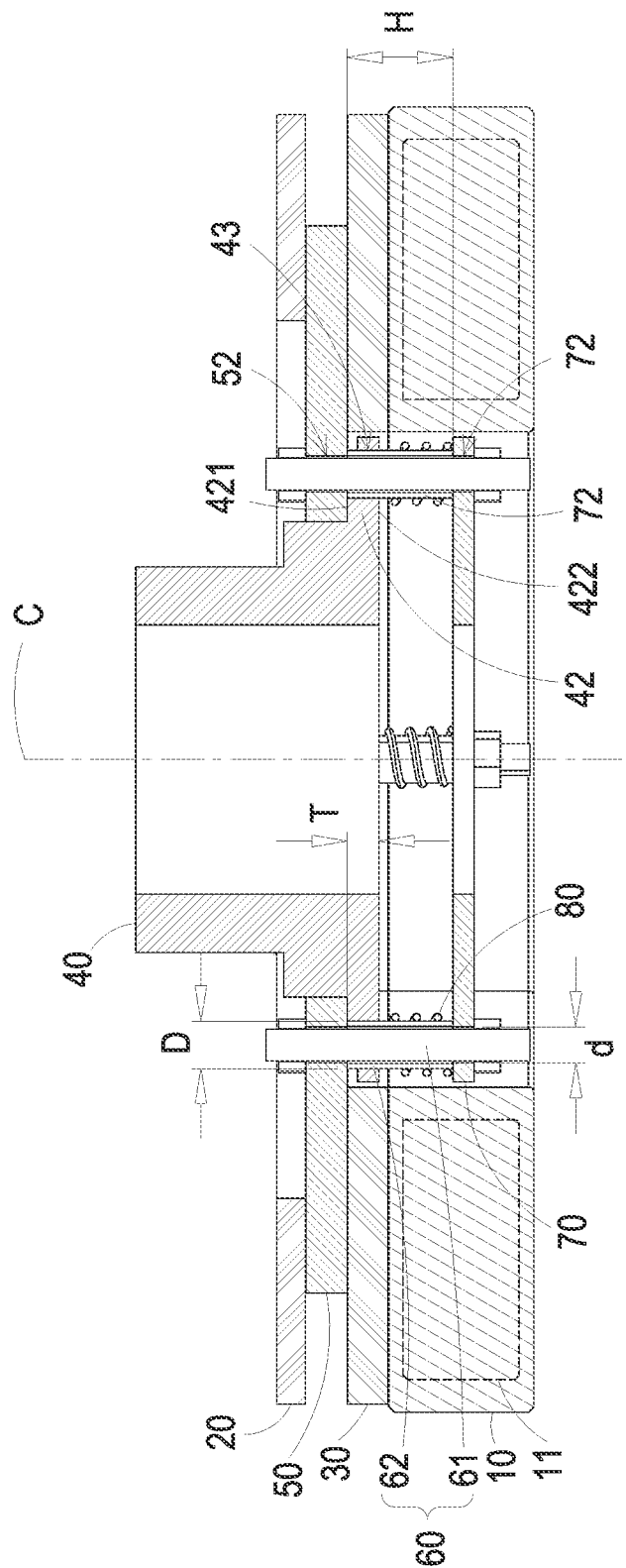
FIG. 8 is a cross-sectional view illustrating the brake device according to the embodiment of the present disclosure.

FIGS. 1 to 8 show a brake device applied to a rotating motor according to an embodiment of the present disclosure. In the embodiment, a brake device of a rotating motor (also referred to a brake device hereafter for short) 1 is applied for braking a rotating shaft 90 of the rotating motor. The brake device 1 includes a base 10, an upper plate 20, a sliding plate 30, a transmission component 40, a lining plate 50, a plurality of connection elements 60, a planar plate 70 and a plurality of elastic components 80. Preferably but not exclusively, in the embodiment, the base 10 is in a ring structure, and includes a driving module 11 and a base hollow portion 12. Preferably but not exclusively, the driving module 11 includes a spring component (not shown) and a coil component (not shown), which are configured to provide a pushing force and a magnetic attraction force, respectively. In the embodiment, the rotating shaft 90 passes through the base hollow portion 12 of the base 10 along an axial direction C. Preferably but not exclusively, the upper plate 20 is in a ring structure and includes an upper-plate hollow portion 21. In the embodiment, the upper plate 20 is spatially corresponding to the base 10, spaced apart from the base 10 along the axial direction C and disposed on the base 10. Similarly, the rotating shaft 90 passes through the upper-plate hollow portion 21 of the upper plate 20 along the axial direction C. In the embodiment, the brake device 1 further includes a plurality of spacer supports 22. The plurality of spacer supports 22 are connected between the base 10 and the upper plate 20, respectively, so that a fixed spaced height is maintained between the upper plate 20 and the base 10. Moreover, the sliding plate 30 is spatially corresponding to the base 10 and the upper plate 20. Preferably but not exclusively, the sliding plate 30 is in a ring structure and includes a sliding-plate hollow portion 31. The rotating shaft 90 passes through the sliding-plate hollow portion 31 of the sliding plate 30 along the axial direction C. In the embodiment, the sliding plate 30 is disposed between the base 10 and the upper plate 20. The plurality of spacer supports 22 and the sliding plate 30 are in a misaligned arrangement with each other. In that, the sliding plate 30 is allowed to slide relative to the base 10 and the upper plate 20 in the axial direction C.

Notably, the spring component of the driving module 11 is disposed between the base 10 and the sliding plate 30, and configured to provide the pushing force for driving the sliding plate 30 to be spaced apart from the base 10. In the embodiment, the coil component of the driving module 11 is embedded within the base 10, and a magnetic attraction force is generated when energizing for driving the sliding plate 30 to resist the pushing force and be attached to the base 10. In other words, in the embodiment, the sliding plate 30 is driven by the driving module 11 to be attached to the base 10 or be spaced apart from the base 10 along the axial direction C. Certainly, the method of the driving module 11 driving the sliding plate 30 to slide is adjustable according to the practical requirements, and the present disclosure in not limited thereto.

Preferably but not exclusively, in the embodiment, the transmission component 40 is a square iron bar or a spline, and sleeved and fixed on the rotating shaft 90 to rotate synchronously with the rotating shaft 90. In the embodiment, the transmission component 40 includes a sleeved peripheral edge 41, a limiting portion 42, a plurality of perforations 43 and an axial aperture 45. The transmission component 40 is sleeved on the rotating shaft 90 through the axial aperture 45. The sleeved peripheral edge 41 is configured to engage with the lining plate 50. In the embodiment, the limiting portion 42 is protruded outwardly from the sleeved peripheral edge 41 in a radial direction of the rotating shaft 90. Preferably but not exclusively, the limiting portion 42 forms an annular flange. Certainly, the limiting portion 42 protruded outwardly from the sleeved peripheral edge 41 is adjustable according to the practical requirements, and the present disclosure is not limited thereto. In the embodiment, the plurality of perforations 43 are passed through the upper surface 421 and the lower surface 422 of the limiting portion 42 along the axial direction C. The lining plate 50 includes a sleeving opening 51. Preferably but not exclusively, the lining plate 50 is sleeved on the sleeved peripheral edge 41 of the transmission component 40 along the axial direction C through the sleeving opening 51. In the embodiment, the sleeving opening 51 of the lining plate 50 is greater than or equal to the sleeved peripheral edge 41 of the transmission component 40. In that, when the transmission component 40 is driven by the rotating shaft 90, the sleeving opening 51 of the lining plate 50 is engaged with the sleeved peripheral edge 41 of the transmission component 40, and the lining plate 50 is carried on the upper surface 421 of the limiting portion 42.

In the embodiment, the lining plate 50 is located between the sliding plate 30 and the upper plate 20. When the driving module 11 drives the sliding plate 30 to be spaced apart from the base 10, the lining plate 50 is clamped by the sliding plate 30 and the upper plate 20, so that the transmission component 40 and the rotating shaft 90 are stopped and motionless synchronously. When the driving module 11 drives the sliding plate 30 to be attached to the base 10, the lining plate 50 is spaced apart from the sliding plate 30 and the upper plate 20, so that the rotational freedom of the lining plate 50 is restored and the lining plate 50 is allowed to be driven by the transmission component 40 to rotate.

Notably, in the embodiment, the planar plate 70 is spatially corresponding to the lining plate 50, and the plurality of the connection elements 60 are connected between the planar plate 70 and the lining plate 50 through the plurality of perforations 43 of the transmission component 40, respectively. Moreover, each of the plurality of elastic components 80 is sleeved on the corresponding one of the plurality of connection elements 60, disposed between the planar plate 70 and the lower surface 422 of the limiting portion 42 of the transmission component 40, and configured to provide a resilient force. In other words, an axial height H is maintained between the planar plate 70 and the lining plate 50 through the plurality of connection elements 60, and the resilient force is provided between the planar plate 70 and the lower surface 422 of the limiting portion 42 of the transmission component 40 by the plurality of elastic components 80, so that the lining plate 50 is driven by the planar plate 70 to abut against the upper surface 421 of the limiting portion 42 of the transmission component 40 along the axial direction C. Since the lining plate 50 abuts against the limiting portion 42 of the transmission component 40 along the axial direction C to form an axial limitation, when the transmission component 40 drives the lining plate 50 to rotate, it is not easy to cause the lining plate 50 to move up and down due to the influence of gravity, or cause the abrasion of the lining plate 50 due to the deflection. At the same time, the generations of the noise and the debris are avoided.

In the embodiment, the plurality of connection elements 60, the plurality of elastic components 80 and the plurality of perforations 43 of the transmission component 40 are in an identical number N, N is an integer, and N is greater than or equal to 3. In this way, a fixed height difference is maintained between the lining plate 50 and the planar plate 70 in the axial direction C through the plurality of connection elements 60 having the same height. Preferably but not exclusively, in the embodiment, there are four perforations 43 centered at the rotating shaft 90, and arranged equidistantly on the limiting portion 42. In other embodiments, the numbers and the arrangements of the connection elements 60 and the perforations 43 are adjustable according to the practical requirements, and the present disclosure is not limited thereto.

In the embodiment, each of the plurality of connection elements 60 includes a fastening bolt 61 and a bushing 62. Preferably but not exclusively, the bushing 62 is in a tubular shape. The bushing 62 passes through the corresponding one of the plurality of perforations 43 on the limiting portion 42 of the transmission component 40 and is connected between the lining plate 50 and the planar plate 70. The fastening bolt 61 passes through the bushing 62 to fasten the lining plate 50 and the planar plate 70. Preferably but not exclusively, in the embodiment, the bushing 62 has an axial height H, and the axial height H is greater than a distance between the upper surface 421 and the lower surface 422 of the limiting portion 42 of the transmission component 40. That is, the axial height H of the bushing 62 is greater than the thickness T of the limiting portion 42. Moreover, in the embodiment, the lining plate 50 includes a plurality of first connection apertures 52 spatially corresponding to the plurality of perforations 43 of the transmission component 40, and the planar plate 70 includes a plurality of second connection apertures 72 spatially corresponding to the plurality of perforations 43 of the transmission component 40. Preferably but not exclusively, the fastening bolt 61 of each connection element 60 passes through the corresponding first connection aperture 52, the corresponding bushing 62 and the corresponding second connection aperture 72 to fasten the lining plate 50 and the planar plate 70 by two nuts on both ends thereof. Preferably but not exclusively, a diameter of the first connection aperture 52 and a diameter d of the second connection aperture 72 are less than a diameter D of the bushing 62, respectively. In that, when the lining plate 50 and the planar plate 70 are fastened by the two nuts on both ends of the fastening bolt 61, the bushing 62 is clamped and fixed between the lining plate 50 and the planar plate 70. With the support and connection of the plurality of bushings 62 between the lining plate 50 and the planar plate 70, the fixed axial height H is maintained.

In the embodiment, the plurality of elastic component 80 includes a plurality of compression springs. Preferably but not exclusively, each compression spring is sleeved on an outer periphery of the corresponding bushing 62, so that an uniform and stable resilient force is provided between the planar plate 70 and the lower surface 422 of the limiting portion 42, and the lining plate 50 is driven by the planar plate 70 through the plurality of connection elements 60 to abut against the upper surface 421 of the limiting portion 42 along the axial direction C. Certainly, the type of the elastic component 80 is adjustable according to the practical requirements, and the present disclosure is not limited thereto. Preferably but not exclusively, in other embodiments, each elastic component 80 is not sleeved on an outer periphery of the corresponding bushing 62, but disposed between the planar plate 70 and the transmission component 40, so as to provide the resilient force. In that, the lining plate 50 is allowed to be driven by the planar plate 70 through the plurality of connection elements 60 to abut against the upper surface 421 of the limiting portion 42 along the axial direction C. The present disclosure is not limited thereto and not redundantly described herein.

Notably, in the embodiment, the base 10, the upper plate 20, the sliding plate 30, the transmission component 40 and the lining plate 50 are assembled to form a brake structure for the rotating shaft 90, so that the braking function of the rotating shaft 90 is achieved. In the brake device 1 of the present disclosure, the planar plate 70, the connection elements 60 and the elastic components 80 are additionally disposed on the lining plate 50 to form an axial limiting structure for the lining plate 50. Preferably but not exclusively, in the embodiment, the base 10, the sliding plate 30 and the upper plate 20 are in a ring structure, respectively. The rotating shaft 90 passes through the base hollow portion 12, the sliding-plate hollow portion 31 and the upper-plate hollow portion 21. The rotation of the rotating shaft 90 is not influenced by the base 10, the sliding plate 30 and the upper plate 20. Notably, the planar plate 70, the connection elements 60 and the elastic components 80 are additionally disposed on the lining plate 50 to realize the axial limiting structure, so that the axial limiting structure is in a misaligned arrangement with the brake structure formed by the base 10, the upper plate 20 and the sliding plate 30. In the embodiment, the base 10 is in a misaligned arrangement with the limiting portion 42, the planer plate 70, the plurality of connection elements 60 and the plurality of elastic components 80 in the axial direction C. Preferably but not exclusively, the limiting portion 42, the planer plate 70, the plurality of connection elements 60 and the plurality of elastic components 80 are received within a communication space of the base hollow portion 12, the sliding-plate hollow portion 31 and the upper-plate hollow portion 21. Since the axial limiting structure realized by adding the planar plate 70, the plurality of connection elements 60 and the plurality of elastic components 80 on the lining plate 50, and the brake structure formed by the base 10, the upper plate 20 and the sliding plate 30 are in a misaligned arrangement with each other, it allows to install the axial limiting structure without increasing the size of the overall structure. Thus, the reliability of the brake device 1 and the competitiveness of the product are enhanced. Certainly, in other embodiments, the axial limiting structure realized by adding the planer plate 70, the plurality of connection elements 60 and the plurality of elastic components 80 on the lining plate 50 is located out of the communication space of the base hollow portion 12, the sliding-plate hollow portion 31 and the upper-plate hollow portion 21. The present disclosure is not limited thereto and not redundantly described herein.

Moreover, in the embodiment, the transmission component 40 further includes at least one fastening hole 44 extended along the radial direction of the rotating shaft 90. The brake device 1 includes at least one fastening element (not shown), such as a screw. Preferably but not exclusively, the at least one fastening element passes through the at least one fastening hole 44 to fasten the transmission component 40 on the rotating shaft 90. In that, when the transmission component 40 is sleeved on the rotating shaft 90 through the axial aperture 45, the transmission component 40 is further fastened on the rotating shaft 90, so that the transmission component 40 and the rotating shaft 90 are allowed to act synchronously. Certainly, in other embodiments, the fitting and the fixing of the transmission component 40 and the rotating shaft 90 are achieved by means of engaging grooves or engaging keys. The present disclosure is not limited thereto and not redundantly described herein.

In summary, the present disclosure provides a brake device applied to a rotating motor. By using an axial limiting structure for the lining plate, the wear and the noise during the rotation of the lining plate are avoided. The axial limiting structure is realized by adding a planar plate, a plurality of connection elements and a plurality of elastic components. An axial height is maintained between the planar plate and the lining plate through the plurality of connection elements, and a resilient force is provided between the planar plate and the transmission component by the plurality of elastic components, so that the lining plate is driven by the planar plate to abut against the transmission component. Since the lining plate abuts against the transmission component along the axial direction to form an axial limitation, when the transmission component drives the lining plate to rotate, it is not easy to cause the lining plate to move up and down due to the influence of gravity, or cause the abrasion of the lining plate due to the deflection. At the same time, the generations of the noise and the debris are avoided. On the other hand, the planar plate, the plurality of connection elements and the plurality of elastic components are additionally disposed on the lining plate to realize the axial limiting structure, so that the axial limiting structure is in a misaligned arrangement with the brake structure formed by the base, the upper plate and the transmission component. Preferably, the planar plate, the plurality of connection elements and the plurality of elastic components are received within the base hollow portion, so that the axial limiting structure is installed without increasing the size of the overall structure. Thus, the reliability of the brake device and the competitiveness of the product are enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A brake device of a rotating motor for braking a rotating shaft, the brake device comprising:
    a base comprising a driving module and a base hollow portion, wherein the rotating shaft passes through the base hollow portion along an axial direction;
    an upper plate spatially corresponding to the base, spaced apart from the base along the axial direction and disposed on the base;
    a sliding plate disposed between the base and the upper plate, and driven by the driving module to be attached to the base or be spaced apart from the base along the axial direction;
    a transmission component sleeved and fixed on the rotating shaft to rotate synchronously with the rotating shaft, wherein the transmission component comprises a sleeved peripheral edge, a limiting portion and a plurality of perforations, the limiting portion is protruded outwardly from the sleeved peripheral edge in a radial direction of the rotating shaft, and the plurality of perforations are passed through the limiting portion along the axial direction;
    a lining plate sleeved on the sleeved peripheral edge of the transmission component along the axial direction, engaged with the sleeved peripheral edge of the transmission component, and carried on an upper surface of the limiting portion, wherein the lining plate is located between the sliding plate and the upper plate, wherein when the driving module drives the sliding plate to be spaced apart from the base, the lining plate is clamped by the sliding plate and the upper plate, so that the transmission component and the rotating shaft are stopped and motionless synchronously, wherein when the driving module drives the sliding plate to be attached to the base, the lining plate is spaced apart from the sliding plate and the upper plate, so that the lining plate is driven by the transmission component to rotate;
    a plurality of connection elements and a planar plate, wherein the planar plate is spatially corresponding to the lining plate, and the plurality of the connection elements are connected between the planar plate and the lining plate through the plurality of perforations, respectively; and
    a plurality of elastic components, wherein each of the plurality of elastic components is sleeved on the corresponding one of the plurality of connection elements, and disposed between the planar plate and a lower surface of the limiting portion, and the plurality of elastic components are configured to provide a resilient force, so that the lining plate is driven by the planar plate to abut against the upper surface of the limiting portion along the axial direction.

2. The brake device of the rotating motor according to claim 1, wherein the driving module comprises a spring component and a coil component, and the spring component is disposed between the base and the sliding plate and configured to provide a pushing force for driving the sliding plate to be spaced apart from the base, wherein the coil component is embedded within the base, and a magnetic attraction force is generated when energizing for driving the sliding plate to resist the pushing force and be attached to the base.

3. The brake device of the rotating motor according to claim 1, wherein each of the plurality of connection elements comprises a fastening bolt and a bushing, each of the bushings passes through the corresponding one of the plurality of perforations and is connected between the lining plate and the planar plate, and each of the fastening bolts passes through the corresponding bushing to fasten the lining plate and the planar plate.

4. The brake device of the rotating motor according to claim 3, wherein the bushings have an axial height, and the axial height is greater than a distance between the upper surface and the lower surface of the limiting portion.

5. The brake device of the rotating motor according to claim 3, wherein each of the elastic components comprises a compression spring sleeved on an outer periphery of the corresponding bushing, so that the resilient force is provided between the planar plate and the lower surface of the limiting portion.

6. The brake device of the rotating motor according to claim 3, wherein the lining plate comprises a plurality of first connection apertures spatially corresponding to the plurality of perforations of the transmission component, and the planar plate comprises a plurality of second connection apertures spatially corresponding to the plurality of perforations of the transmission component, wherein each of the fastening bolts passes through the corresponding first connection aperture, the corresponding bushing and the corresponding second connection aperture to fasten the lining plate and the planar plate.

7. The brake device of the rotating motor according to claim 6, wherein a diameter of each first connection aperture and a diameter of each second connection aperture are less than a diameter of each bushing, respectively.

8. The brake device of the rotating motor according to claim 1, wherein the base is in a misaligned arrangement with the limiting portion, the planar plate, the plurality of connection elements and the plurality of elastic components in the axial direction.

9. The brake device of the rotating motor according to claim 1, wherein the transmission component comprises at least one fastening hole extended along the radial direction of the rotating shaft, and the brake device comprises at least one fastening element, wherein the fastening element passes through the corresponding fastening hole to fasten the transmission component on the rotating shaft.

10. The brake device of the rotating motor according to claim 1, wherein the plurality of connection elements, the plurality of elastic components and the plurality of perforations are in an identical number (N), (N) is an integer, and (N) is greater than or equal to 3.

11. The brake device of the rotating motor according to claim 1, wherein the lining plate comprises a sleeving opening, and the lining plate is sleeved on the sleeved peripheral edge of the transmission component through the sleeving opening, wherein the sleeving opening of the lining plate is greater than or equal to the sleeved peripheral edge of the transmission component.

12. The brake device of the rotating motor according to claim 1, wherein the sliding plate comprises a sliding-plate hollow portion, the upper plate comprises an upper-plate hollow portion, the planar plate comprises a planar-plate hollow portion, and the rotating shaft passes through the base hollow portion, the sliding-plate hollow portion, the upper-plate hollow portion and the planar-plate hollow portion.

13. The brake device of the rotating motor according to claim 1, further comprising a plurality of spacer supports, wherein the plurality of spacer supports are connected between the base and the upper plate, respectively, and the plurality of spacer supports and the sliding plate are in a misaligned arrangement with each other.

* * * * *